Figure 1:
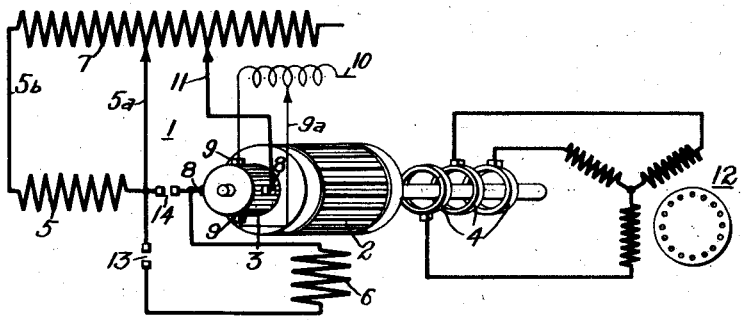

March 18, 1924.

R. E. HELLMUND

COMBINED FREQUENCY CHANGER AND PHASE CONVERTER

Filed March 31, 1919

WITNESSES:
J. A. Helsel.
a. o. Brand

INVENTOR
Rudolf E. Hellmund.
BY
Wesley G. Carr
ATTORNEY

Patented Mar. 18, 1924.

1,486,889

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

COMBINED FREQUENCY CHANGER AND PHASE CONVERTER.

Application filed March 31, 1919. Serial No. 286,433.

*To all whom it may concern:*

Be it known that I, RUDOLF E. HELLMUND, a citizen of Germany, and a resident of Swissvale, in the county of Allegheny and State of Pennsylvania, have invented a new and useful Improvement in Combined Frequency Changers and Phase Converters, of which the following is a specification.

My invention relates to combined frequency changers and phase converters, and it has for its object to provide apparatus of the character designated in which a synchronously-rotating field is established and in which the speed of the machine is so adjusted that the co-action between the armature member thereof and the rotating field is such that a balanced polyphase voltage may be drawn from the machine in question, this derived voltage being of a frequency other than that of the energy with which the machine is supplied.

A single-phase commutator motor, having armature excitation and a shunt characteristic, operates at substantially synchronous speed, and a stator field of nearly uniform strength, and revolving at synchronous speed is established therein. I find that, when such a motor is made to rotate at speeds different from synchronous speed, while the uniform field continues to rotate at synchronous speed, it is possible to derive low-frequency currents from slip rings connected to the armature winding of the machine. The frequency of these currents may be varied if convenient means for varying the speed are provided, and, if the synchronously rotating field is kept uniform, the currents thus derived from the slip rings will be balanced in character. It is evident that, if the main or torque field of the machine is maintained constant, while the effective armature voltage is changed, a change in speed of the machine will be obtained and the co-action between the constantly rotating field and the varying-speed armature winding will result in currents of varying frequencies being made available at the slip rings of the motor.

In other words, the dynamo-electric machine, above described, will function as a combined frequency changer and phase converter, the number of slip rings which are provided determining the number of phases which may be supplied from the machine.

Although I have considered, in the ensuing description, a machine which is supplied with single-phase energy and have pointed out that polyphase currents may be derived therefrom, it is entirely possible that the operation of the machine may be reversed or, more broadly, that, by means of my invention, currents of one phase number and frequency may be transformed into currents of any other desired phase number and frequency.

Figure 2:
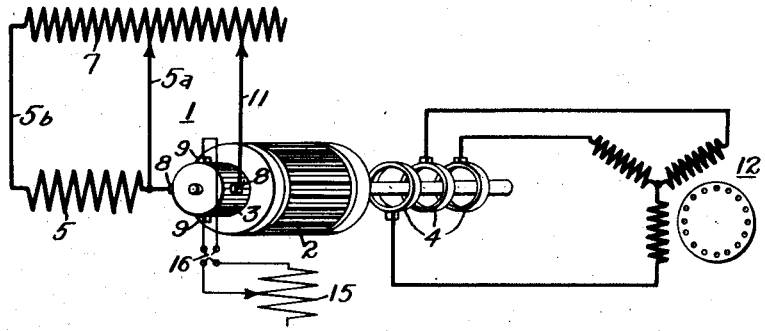
Figure 3:
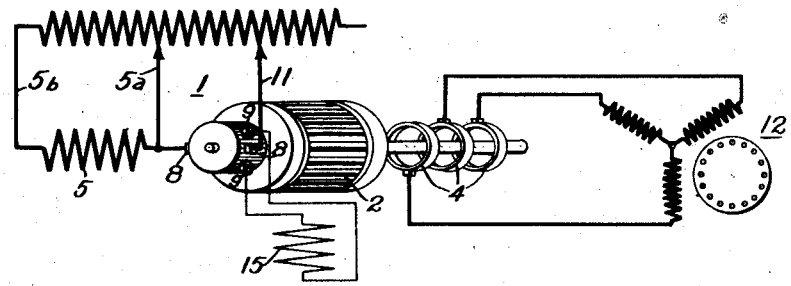
Figure 4:
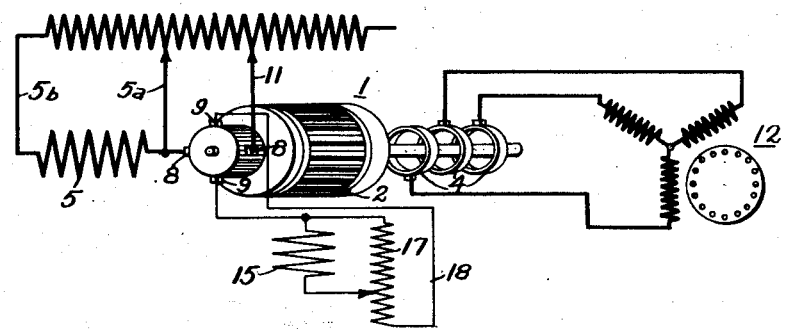

For a better understanding of my invention, reference may be had to the accompanying drawing in which Figure 1 illustrates, diagrammatically, a dynamo-electric machine constructed in accordance with my invention, and connected between a source of energy and a consumption device; Figs. 2, 3 and 4 illustrate modifications of the machine shown in Fig. 1, in which various means of changing the speed of the armature winding without affecting the uniformity of the rotating field, are employed.

Referring now more specifically to Fig. 1, a dynamo-electric machine 1 comprises an armature 2, a commutator cylinder 3, slip rings 4, and field windings 5 and 6, the latter winding being here utilized for starting purposes only. The machine 1 is energized from any suitable source of energy, here shown as a secondary member 7 of a transformer. Brushes 8—8 and 9—9 bear upon the commutator cylinder 3, the former being the medium through which energy currents are supplied to the armature 2 of the machine 1, and the latter being closed-circuited through an inductance device 10.

One of the brushes 8 is connected to the source of energy 7 through an adjustable tap connection 11. Any suitable polyphase consumption device may be supplied from the slip rings 4 of the machine, and I have here illustrated, merely for convenience, an induction motor 12 as so supplied.

It should be observed that the brushes 9 are closed-circuited through the inductance 10, the turns of the latter being tapped to be varied by the adjustment of a suitable tap connection 9a. Furthermore, it should be observed that the energization of the cross or inducing field winding 5 is maintained by reason of connections 5a and 5b.

As a convenient means of starting machine 1, I close a switch 13 and open a switch 14, this connection resulting in energy being supplied to the machine through the inducing field winding 5 and the torque field winding 6. After the starting operation is completed, the switch 13 may be opened and the switch 14 closed, whereupon the machine will operate in the usual manner of an armature excited single-phase commutator motor. It is apparent that, when operating as above described, a synchronously rotating and uniform field will be established, if the connecting point of tap 5a coincides with that of tap 11, in connection with the machine and, under normal conditions, the machine itself will likewise be rotating at substantially synchronous speed and, therefore, no energy will be available at the slip rings 4. However, if means are provided whereby the effective armature voltage may be increased, the speed of the machine will increase. Movement of the tap 11 away from coincidence with tap 5a will increase the voltage impressed on the armature. Such an increased voltage will result in an increased speed of the machine which will, in turn, increase the voltage induced between the brushes 9—9.

With the field rotating synchronously, while the speed of the machine varies, as just described, I find that a current of definite frequency may be derived from the slip rings. However, the increase in speed and a consequent increase in the main or armature field strength will cause a distortion of the revolving field because of the co-action between the changing armature field and the cross or inducing field, the latter remaining constant, of course, on account of being connected across a fixed portion of the winding 7. Any polyphase power which may be derived from the slip rings, under these circumstances, will have harmonic currents present therein which will interfere, to some extent, with the operation of such consumption devices as are supplied thereby.

In order to prevent the distortion of the rotating field and to maintain it uniform, despite the distorting tendency exerted thereupon by the increased armature field, I make use of the inductance member 10, the active portion of which is increased simultaneously with the increase in the effective armature voltage, which manipulation results in the maintenance of a constant-torque field, despite the increased speed. A reverse action takes place, of course, when the speed of the machine is decreased.

It will be apparent, therefore, that I provide a machine driven by single-phase energy from which it is possible to derive variable-frequency, polyphase power, such power being balanced by reason of the corrective effect exerted by the insertion in the closed-circuited brush connection of the inductance device. Another advantage of this system is, that, while variations in the load may cause certain impedance drops which result in changes in the field, these may be compensated for by further adjustment of the device 10.

Instead of adjusting the main or torque field by the insertion in the circuit thereof of the inductance 10, a permanent stator field winding 15 may be employed, the strength of which may be adjusted, both in size and direction, this last being provided for by a reversing switch 16, as shown in Fig. 2. The field winding 15 may also be used to make the machine self-starting, as in the series-excited machine illustrated in Fig. 1. It should be noted that, because the reversing switch 16 admits of a change in direction of the armature current, the adjustable tap 11 may be shifted to the left of the point where the tap 5a connects with the member 7, and the frequency may be varied in a direction opposite to that described in connection with Fig. 1.

In Fig. 3 is illustrated another method for maintaining the main field constant. In this instance, the brushes 9—9 are shifted around the commutator cylinder in such manner that the field is maintained at a predetermined strength.

Still another method of main field regulation is illustrated in Fig. 4. Here a transformer winding 17 is employed, and the field winding 15 is permanently connected thereto, the desired regulation being obtained by the use of an adjustable tap 18 which cuts certain turns of the winding 17 in or out of circuit, as dictated by the changing speed of the armature.

While I have described a plurality of embodiments of my invention, it is obvious that many further modifications may occur to those skilled in the art, and I desire, therefore, that the invention shall be limited only by the prior art or by the scope of the appended claims.

I claim as my invention:

1. In combination with a source of single-phase alternating current, a dynamo-electric machine, commutator means for establishing a uniform field rotating at a constant speed therein, means whereby polyphase energy differing in frequency from that of said source may be derived from said machine, and means for maintaining said rotating field uniform irrespective of the difference between said frequencies.

2. In combination with a source of single-phase alternating current, a dynamo-electric machine energized therefrom, commutator means for establishing a uniform field rotating at a constant speed in said machine, means for varying the speed of said machine while the rotating-field speed is maintained constant, and means whereby polyphase energy of a frequency differing from the frequency of the energy supplied to said machine may be derived therefrom.

3. In combination with a single-phase source of alternating current, a dynamo-electric machine having a commutator member energized therefrom, means associated with said commutator member for establishing a uniform field rotating at a constant speed relative thereto, means for varying the speed of said machine while the rotating-field speed is maintained constant, means for maintaining the rotating field uniform despite the operation of said last-named means, and means whereby energy of a phase number and frequency differing from the phase number and frequency of the energy supplied to said machine may be derived therefrom.

4. In combination with a source of single-phase alternating current, a dynamo-electric machine having a commutated winding adapted to derive energy therefrom, means associated with said commutated winding for establishing a uniform field rotating relatively thereto at a speed corresponding to synchronism of said source of alternating-current energy, means to cause the speed of said machine to depart from the speed of said rotating field, whereby energy differing in phase number and frequency from that furnished to said machine may be derived therefrom.

5. In combination with a single-phase source of alternating current, a dynamo-electric machine having a commutated winding adapted to derive energy therefrom, means for establishing, in said commutated winding, a uniform field rotating relatively thereto at a speed corresponding to synchronism of said source of alternating-current energy, means to cause the speed of said machine to depart from the speed of said rotating field, and means to maintain said rotating field uniform, irrespective of the distortion tendency exhibited by said last-named means, whereby energy differing in phase number and frequency from that furnished to said machine may be derived therefrom.

6. In combination with a single-phase commutator machine comprising an armature and an inducing field winding, means cooperating with said inducing field winding whereby a uniform, synchronously-rotating field is established in said armature, means for causing the speed of said armature to depart from synchronism, and means whereby energy having a phase number and frequency differing from the phase number and frequency of the energy which is supplied to said machine may be derived therefrom.

7. In combination with a single-phase commutator machine comprising an armature and an inducing field winding, means cooperating with said inducing field winding whereby a uniform, synchronously-rotating field is established in said armature, means for causing the speed of said armature to depart from synchronism, and means whereby energy having a phase number and frequency differing from the phase number and frequency of the energy which is supplied to said machine may be derived therefrom, and means to maintain said rotating field substantially uniform, irrespective of the distorting tendency of said speed-changing means, whereby the energy derived from said machine is balanced.

8. A dynamo-electric machine comprising an inducing field winding, means cooperating therewith for establishing a synchronously-rotating field, an armature winding, a commutator cylinder connected to said armature winding, slip rings connected thereto, means whereby the effective armature voltage of said machine is varied while the strength of said field is maintained constant, and means for maintaining said field uniform, irrespective of the distorting tendency exerted by the armature voltage-varying means, whereby balanced polyphase currents of one frequency may be derived from said slip rings when single-phase currents of another frequency are furnished to the commutator.

9. An alternating-current commutating machine having an armature winding connected to a commutator cylinder, an inducing winding adapted to be connected to a single-phase translating device, a pair of main brushes bearing upon said commutator cylinder in substantial alignment with the axis of said inducing winding, a pair of auxiliary brushes having electromotive forces generated by the rotation of said armature winding in the field of said inducing winding, variable impedance means connecting said auxiliary brushes, and polyphase connections from certain points of said armature winding adapted to be connected to a polyphase translating device.

In testimony whereof I have hereunto subscribed my name this 27th day of March, 1919.

RUDOLF E. HELLMUND.